United States Patent [19]
Gargas et al.

[11] Patent Number: 5,746,921
[45] Date of Patent: May 5, 1998

[54] FLUIDIZED BED AQUARIUM FILTRATION METHOD

[75] Inventors: Joseph E. Gargas, Apollo Beach, Fla.; Robert H. Hyde, Budd Lake, N.J.

[73] Assignee: The Hartz Mountain Corporation, Secaucus, N.J.

[21] Appl. No.: 800,912

[22] Filed: Feb. 13, 1997

Related U.S. Application Data

[62] Division of Ser. No. 481,729, Jun. 7, 1995, Pat. No. 5,632,887.

[51] Int. Cl.$^6$ .............................. A01K 63/04; C02F 3/06
[52] U.S. Cl. .................................... 210/617; 210/661
[58] Field of Search ............................ 210/615, 616, 210/617, 620, 661, 903, 150, 151, 169, 264, 290, 416.2

[56] References Cited

U.S. PATENT DOCUMENTS

| | | |
|---|---|---|
| 546,883 | 9/1895 | Gunther. |
| 3,135,238 | 6/1964 | Eyl ........................................ 119/5 |
| 3,471,025 | 10/1969 | Dobson ................................ 210/290 |
| 3,693,798 | 9/1972 | White ................................... 210/169 |
| 3,933,629 | 1/1976 | Smith ................................... 210/150 |
| 4,002,566 | 1/1977 | Smith ................................... 210/169 |
| 4,009,099 | 2/1977 | Jeris .................................... 210/151 |
| 4,606,821 | 8/1986 | D'Imperio ........................... 210/169 |
| 4,833,594 | 5/1989 | Sekoulove ........................... 210/603 |
| 4,863,594 | 9/1989 | Pedretti .............................. 210/169 |
| 4,869,815 | 9/1989 | Bernard et al. .................... 210/151 |
| 4,988,436 | 1/1991 | Cole .................................... 210/169 |
| 5,011,600 | 4/1991 | Mowka ................................ 210/169 |
| 5,055,186 | 10/1991 | Van Toever ........................ 210/150 |
| 5,062,951 | 11/1991 | Tominaga ........................... 210/169 |
| 5,171,438 | 12/1992 | Korcz .................................. 210/169 |
| 5,172,650 | 12/1992 | Hsu ..................................... 119/5 |
| 5,433,843 | 7/1995 | Calabrese ........................... 210/138 |
| 5,453,183 | 9/1995 | Hoffa .................................. 210/169 |

FOREIGN PATENT DOCUMENTS

| | | |
|---|---|---|
| 0344295 | 3/1994 | European Pat. Off. . |
| 3544383 | 1/1987 | Germany . |

OTHER PUBLICATIONS

Heinen et al "Tolerance to Formalin . . . ", J. World Aquaculture Soc., vol. 26. No. 1. Mar. 1995. pp. 65–71.
Bullock et al "Qualitative and Quantitative Bacteriological Studies . . . ", U.S. Dept. of Int. Biological Rep. 17, Jul., 1993.
Ko et al "Area Specific Nitrification Rates of a Micro–Bead Filter", Acquaculture '95 Feb. 1–4, 1995.
Sutton et al "Biological Fluidized Beds . . . " Water Environment and Tech., Aug. '91 pp. 52–56.
Paller et al., "Use of Ozone and Fluidized Bed Biofilters . . . " Progressive Fish Culture, 50:141–147 (1988).
Jewell, "Wastewater treatment by Immobilized Cells" Ch. 9 pp. 223–252.
Malone et al, "Design of Recirculating Soft Crawfish Shedding Systems", Louisiana Sea Grant College Program, Jun., 1988.
"Backwash of Granular filter used in Wastewater Filtration". U.S.E.P.A. No. 600/2-77-016.

*Primary Examiner*—Neil McCarthy
*Assistant Examiner*—Theodore M. Green
*Attorney, Agent, or Firm*—Stroock & Stroock & Lavan LLP

[57] ABSTRACT

An aquarium filter for removing chemical and physical waste from an aquarium. The filter includes a fluidized bed of particles, such as sand, for removing ammonia from the water. The filter can also include a physical trap for solid material and activated charcoal for removing organic material from the aquarium water. The filter can be constructed in an aesthetically desirable manner and can be convenient to maintain.

20 Claims, 10 Drawing Sheets

FLUIDIZED BED AQUARIUM FILTRATION METHOD

This application is a division of Ser. No. 08/481,729 filed Jun. 7, 1995, U.S. Pat No. 5,632,887.

BACKGROUND OF THE INVENTION

This invention relates generally to aquariums and more particularly to a method and device for maintaining a healthy environment for fish within the aquarium, by removing undesirable materials from the aquarium water.

Undesirable material is being generated constantly within an aquarium. Fish ingest food and eliminate solid and chemical wastes. Uneaten food also leads to solid waste. That solid waste can also be broken down by bacteria within the tank to form other secondary wastes. These wastes can encourage the growth of algae or other undesirable life forms and stress fish in the aquarium. Accordingly, it is desirable to remove both solid and chemical wastes from an aquarium in order to provide a healthy environment and reduce stress on fish within the aquarium.

A common aquarium filter employs carbon particles for removing organic waste from the aquarium water and a fibrous pad or wad to trap solid waste. The carbon and fibers are commonly located in a small tank which hangs from the side of the aquarium. A pump is used to draw water from the aquarium into the conventional filter which then flows from the filter back to the aquarium. Changing the charcoal and fiber is inconvenient and the filter has little aesthetic value. Furthermore, the carbon/fiber filter system can be unable to minimize certain wastes that can put stress on fish in the aquarium.

Other conventional filters draw aquarium water into the gravel at the bottom of the aquarium which then flows out through carbon particle cartridges. Solid matter becomes trapped in the gravel, where it can decompose biologically. Some of the biological decomposition leads to undesirable chemical byproducts which can stress the fish. The carbon cartridges are employed to remove organic material from the aquarium water. Such filters leave unsightly debris at the aquarium bottom and are ineffective for removing certain chemical wastes.

Over the years, various attempts have been made to overcome functional and aesthetic drawbacks in conventional filters. U.S. Pat. No. 3,135,238 describes a filter tank mounted on the side of an aquarium. Water is drawn from the aquarium, to the tank, down through a filtering medium such as sand or glass wool for catching waste and sediment, then back to the aquarium by passing up through the gravel for the purpose of additional filtration of the finer particles of waste and foreign matter.

U.S. Pat. No. 4,002,566 describes an external tank that receives waste from the aquarium. The water passes through a coarse filter material in the tank, then back through the bottom of the aquarium and up through the gravel. Gases, such as ammonia, derived from fish waste and uneaten food is merely permitted to evaporate from the surface of the aquarium water.

U.S. Pat. No. 4,606,821 describes a multi-layer filter in which water flows into the top of the filter, down through multiple layers of filtering media, then up through the bottom of the aquarium. U.S. Pat. No. 4,863,594 also describes a filtration method in which water flows up through the gravel to prevent uneaten food and waste from accumulating therein. U.S. Pat. No. 5,062,951 describes an in-tank pump, which draws in water and forces it up and out through the gravel on the aquarium floor. U.S. Pat. No. 5,172,650 describes an aquarium filter in which sediments are collected separately so that they can be removed without interfering with operation of the filter. The contents of U.S. Pat. Nos. 3,135,238, 4,002,566, 4,606,821, 4,863,594, 5,062,951 and 5,172,650 are incorporated herein by reference.

Although these patents present various ways of attempting to maintaining a healthy environment in an aquarium, they have shortcomings. None present a fully satisfactory method and filter for eliminating waste from the aquarium water. For example, while some of these discusses the use of bacteria colonies in gravel bed, for providing biological filtration, such filtration has not proved to be fully effective for removing undesirable chemicals from the water. Furthermore, the bacteria grow in a generally unrestrained and uncontrolled manner and can be detrimental to the aquarium environment. Also, the accumulation of debris at the bottom of the aquarium is undesirable, unhealthy and unsightly. Finally, many of these filters require flow rates that unduly stress certain types of fish in order to provide effective filtration. Accordingly, it is desirable to provide an improved aquarium filter which overcomes the drawbacks in the prior art.

SUMMARY OF THE INVENTION

Generally speaking, in accordance with the invention, an aquarium filter is provided for removing chemical and physical waste from an aquarium. The filter includes a fluidized bed of particles, such as sand, for removing ammonia from the water. The filter can also include a physical trap for solid material and activated charcoal for removing organic material from the aquarium water. The filter can be constructed in an aesthetically desirable manner and can be convenient to maintain.

Accordingly, it is an object of the invention to provide an improved aquarium filter for removing solid and chemical waste from an aquarium.

Another object of the invention is to provide a method of maintaining a healthy, clean water environment in an aquarium.

A further object of the invention to provide an aquarium filter that is aesthetically pleasing.

Yet another object of the invention is to provide an aquarium filter that is easy to maintain.

Still other objects and advantages of the invention will in part be obvious and will in part be apparent from the specification and drawings.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

A filter constructed in accordance with a preferred embodiment of the invention includes a fluidized bed for providing enhanced filtration properties. By promoting desirable biochemical reactions, the filter can maintain desirable water quality despite the pressure of a large fish population (bioload). The filter includes a column of particles, such as sand or fine gravel. Water is removed from the aquarium and pumped up through this particulate bed at a sufficient rate to "fluidize" the bed of particles in a manner similar to the way gas is used to fluidize a fluidized bed for conducting chemical reactions. Such fluidization will increase the height of the bed and the effectiveness of the particles for providing fluidization properties.

As the velocity of aquarium water flowing up through the column reaches a fluidizing velocity the drag force on the particles, which is equal to the pressure drop across the bed multiplied by the column cross sectional area, will substantially equal the weight of the particles and the particles will be in motion and exhibit a churning action. Particles of similar drag and weight will accumulate at similar levels. Thus, the smaller particles will "float" to the top and larger particles will churn at the bottom of the column. If the velocity is below the fluidizing velocity, the bed of particles will remain static. If the velocity is too high, the lightest particles will be blown over the top of the column. However, within a range of fluid velocities that varies with the particle and column dimensions, the particles are set in motion and the height of the bed increases.

By selecting particles of appropriate dimensions, the growth of nitrifying autotrophic bacteria thereon can be emphasized. Autotrophic bacteria, such as nitrosomonas, are primarily responsive for the nitrification process and oxidize ammonia ($NH_3$) into nitrites ($NO_2^-$). Other autotrophic bacteria include nitrobacter, which convert these nitrites ($NO_2^-$) into nitrates ($NO_3^-$). Thus, by passing the aquarium water past these autotrophic bacteria, ammonia levels in the aquarium water can be reduced by conversion into nitrates. By passing the water over the particles at a velocity to set the particles in motion, the effectiveness of the biological filtration will be enhanced.

Heterotrophic bacteria are responsible for producing the slime that forms in the aquarium on glass, plants, filter parts and so forth. These bacterium convert waste into ammonia. Therefore, if these bacterium are permitted to grow they will have a deleterious effect on water quality. Consequently, by promoting the growth of nitrifying autotrophic bacteria, and limiting the growth of heterotrophic bacteria on the fluidized bed particles, ammonia levels within the aquarium can be greatly reduced. Autotrophic bacteria are typically much smaller than heterotrophic bacteria. It was discovered that if the particles in the bed are sufficiently small and have suitable pores and other surface irregularities, the particles will be colonized primarily by nitrifying bacteria within the pores and irregularities.

An added benefit of a fluidized bed filter in accordance with the invention is the reduction in nitrate levels. The filter is extremely efficient in converting $NH_3$ into $NO_3$. Thus, oxygen levels in some portions of the filter, such as at the top of the column, will drop to very low levels. With time, significant numbers of dissimilatory bacteria, which use $NO_3$, rather than $O_2$, will appear. In time, they will reduce the $NO_3$ in the tank to harmless byproducts such as $N_2$. Thus, a filter in accordance with the invention can not only reduce ammonia levels in the aquarium, but nitrate levels as well.

One drawback of static conventional gravel based or sand based biological filters is that they became heavily colonized by heterotrophic bacteria. It was discovered that the churning action of a fluidized bed of particles makes it difficult for the larger heterotrophic bacteria to latch onto the outside of the particles. Thus, while the desirable nitrifying bacteria can grow in the protected irregular contours of the particles, the undesirable larger heterotrophic bacteria become scoured off the outside of the particles so that the net result is a column of particles colonized primarily by nitrifying bacteria. Thus, the particles can significantly decrease the ammonia content of the aquarium water by providing superior biological filtration than conventional biological filters.

For aesthetic purposes, it is desirable to construct a column with a rectangular cross-section. The churning particles of the fluidized bed also provides an intriguing visual effect. Thus, the filter can actually enhance the overall visual appearance of the aquarium, rather than detract from it. Furthermore, a square shape also leads to an approximately 25% increase in cross sectional area over a cylindrical column of equal cross sectional width. However, the rectangular or square shape makes it difficult to fluidize the particles.

It was discovered that by passing the water through appropriate structures, the flow can become more evenly spread out across the entire cross-section of the column. This more uniform fluid velocity profile significantly improves the efficiency of the filter.

One way to achieve a uniform flow profile with a square cross section column is to pass the water from the aquarium through a diffusion plate, also referred to as a flow distribution plate, which can be constructed as a plate having perforations therein located across the entire bottom of the bed. By sizing the holes in an appropriate manner, such as by providing more and/or larger holes at the periphery and/or corners and fewer and/or smaller holes at the center, a more uniform flow through the column can be provided. The holes can be uniform throughout the thickness of the plate, or cone shaped. A uniform distribution with double taper holes described below has been found to be desirable.

The uniformity of the flow can be further enhanced by positioning relatively large particles, such as pea gravel or large grain sand, over the inlet or over the flow distribution plate and then disposing smaller grain sand or some other relatively smaller media over the larger particles. Thus, the diffusion plate provides a first structure for evening the flow and the relatively large particles act as an alternate or second structure for evening the flow across the entire cross-section of the column.

One drawback of using pea gravel, is that the large size and lack of movement can lead to the growth of heterotrophic bacteria. This counteracts the function of the nitrifying bacteria by actually increasing the amount of ammonia in the aquarium. If instead of these large particles, large sand is used to support the finer particles, and the flow is sufficient to generate some movement or churning (partial or complete fluidization) of the larger supporting particles, there will be a self-scouring action which inhibits the growth of heterotrophic i bacteria. Hence, the column can become virtually maintenance free for extended periods of time.

As noted above, the velocity of water through the column determines whether the bed will become fluidized. Larger particle diameters, higher solid densities, more aerodynamic particles and larger void spaces between the particles lead to a need for higher fluid velocity through the column. Likewise, beds with lighter or smaller particles, having irregular shapes and little void regions between the particles will become fluidized at slower fluid velocities through the column.

Sand or silica of a particular grade is generally made up of particles of various sieve number sizes. Thus, a pound of grade 20/30 silica is approximately 7.5%. Sieve No. 20, 90% Sieve No. 30 and about 2.5% sieve no. 40. Approximate size distribution for 20/30, F-35 and F-50 silica are given below in Table 1.

TABLE 1

Particle Size Distribution

| Sieve No. | 20/30 | F-35 | F-50 |
|---|---|---|---|
| 20 | 7.5% | | |
| 30 | 90% | 3% | 1% |
| 40 | 2.5% | 50% | 11% |
| 50 | | 40% | 34% |
| 70 | | 6% | 35% |
| 100 | | 1% | 16% |
| 140 | | | 2% |
| 200 | | | 1% |

In use, the larger particles will collect towards the bottom of the column and the smaller particles will reside near the top of the fluidized bed. The heavier particles may only churn and will help distribute the flow more evenly, as the smaller particles become more classically fluidized. The use of multiple sizes of sand helps prevent vertical channeling, while permitting use of fine sand particles having very high surface areas an the ability to perform very high biological conversions. For a smaller filter of about 2"×2" and over about 8" tall, about 1–2.5 oz. of 20/30 silica and 6–8 oz. of F-35 silica, yielding a surface area of about 20–30 ft$^2$ provides suitable results for aquariums of up to about 40–50 gallons, at flow rates of about 50–80 gallons per hour. For larger tanks, a 3"×3" column over 10" high and run at over 100 gallons per hour is suitable. This column can be filled with about 3–5 oz. 20/30 silica, 4–5.5 oz. F-35 silica and 10–15 oz. F-50 silica, for a total area of 50–70 ft$^2$.

The particle distribution for a high flow rate system of about to 2000 gallons per hour is shown below in Table 2. The particle distribution for a 500 to 1000 gallon system is shown below in Table 3. These systems can be run in a 6"×6"×6' rectangular column. Generally, the system should have at least 5%, preferably 10% of at least 5 sieve nos. of sand to obtain a suitable range of particle sizes and over 800, preferably over 1000 ft$^2$ of surface area, and fluidization of 200–300%, preferably over 300%.

TABLE 2

High Flow Rate Systems: 1000 to 2000 Gallons Per Hour

| | lb. of | | | | | |
|---|---|---|---|---|---|---|
| Sieve No. | 20/30 | F-35 | F-42 | F-50 | Total (lb.) | Wt. % |
| 20 | 0.1875 | 0 | 0 | 0 | 0.1875 | 1 |
| 30 | 2.25 | 0.27 | 0 | 0.16 | 2.68 | 10 |
| 40 | 0.0625 | 4.5 | 0 | 1.76 | 6.3225 | 23 |
| 50 | 0 | 3.6 | 0 | 5.44 | 9.04 | 33 |
| 70 | 0 | 0.54 | 0 | 5.6 | 6.14 | 22 |
| 100 | 0 | 0.09 | 0 | 2.56 | 2.65 | 10 |
| 140 | 0 | 0 | 0 | 0.32 | 0.32 | 1 |
| 200 | 0 | 0 | 0 | 0.16 | 0.16 | 1 |
| Total | 2.5 | 9 | 0 | 16 | 27.5 | 1.00 |
| Surface area sq. ft. | 46 | 303.3 | 0 | 800 | 1149.3 | |

TABLE 3

Low Flow Rate Systems: 500 to 1000 Gallons Per Hour

| | lb. of | | | | | |
|---|---|---|---|---|---|---|
| Sieve No. | 20/30 | F-35 | F-42 | F-50 | Total (lb.) | Wt. % |
| 20 | 0.1875 | 0 | 0 | 0 | 0.1875 | 1 |
| 30 | 2.25 | 0.075 | 0 | 0.175 | 2.5 | 11 |
| 40 | 0.0625 | 12.5 | 0 | 1.925 | 3.2375 | 14 |
| 50 | 0 | 1 | 0 | 5.95 | 6.95 | 31 |
| 70 | 0 | 0.15 | 0 | 6.125 | 2.275 | 28 |
| 100 | 0 | 0.025 | 0 | 2.8 | 2.825 | 13 |
| 140 | 0 | 0 | 0 | 0.35 | 0.352 | 2 |
| 200 | 0 | 0 | 0 | 0.175 | 0.175 | 1 |
| Total | 2.4 | 2.5 | 0 | 17.5 | 22.5 | 1.00 |
| Surface Area Sq. Ft. | 46 | 84.25 | 0 | 22.5 | 1005.25 | |

The filter can also include physical entrapment portions and organic filtration portions. For example, a pad or wad of fibrous material can be used to entrap physical waste. It is preferably disposed between water exiting the column and the aquarium. The water can also flow through activated charcoal granules, a filter pad impregnated with activated charcoal to remove organic material within the water.

Thus, the water in an aquarium can be kept suitably clean by passing it through a column of particles having nitrifying bacteria thereon in order to remove ammonia from the water and also passing the water through fibrous and/or granular filters, such as a fiber pad and a pad impregnated with activated charcoal. The column of particles including the nitrifying bacteria is preferably in the form of a fluidized bed which preferably has a rectangular cross-section.

Figure 1:
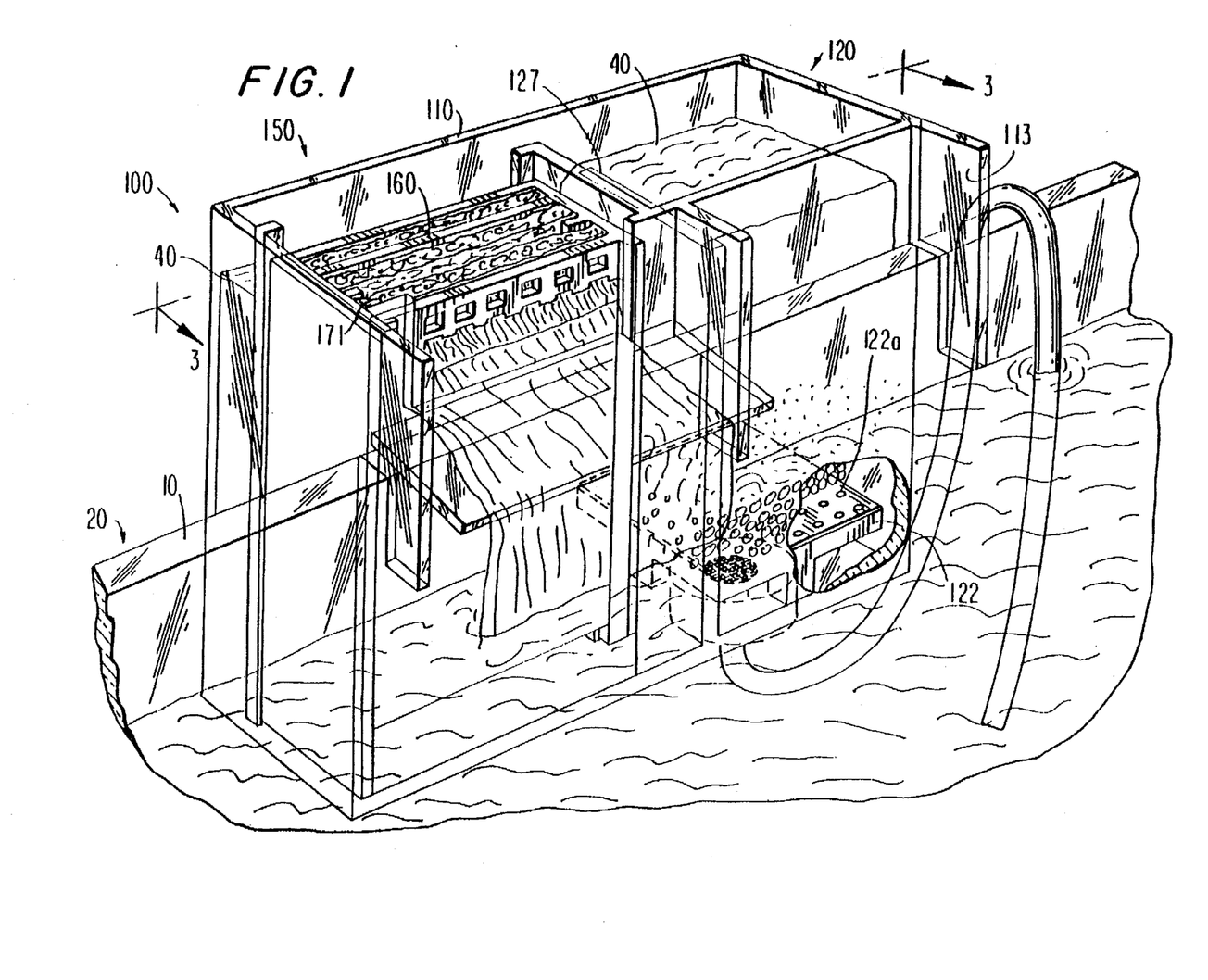
FIG. 1 is a perspective view of an aquarium filter constructed in accordance with a preferred embodiment of the invention.

An aquarium filter constructed in accordance with a preferred embodiment of the invention is shown generally as filter 100 in FIG. 1. Filter 100 includes a housing 110 defining two compartments, a column 120 and a filtration region 150. Filter 100 also includes a plurality of hooks 113 for hanging filter 100 from a side 10 of an aquarium 20. FIGS. 1, 2, 4 and 5 show Filter 100 in an operating condition and FIG. 3 shows it in a static state. The specific construction of filter 100 is presented for purposes of illustration only and is not intended to be construed in a limiting sense.

Figure 5:
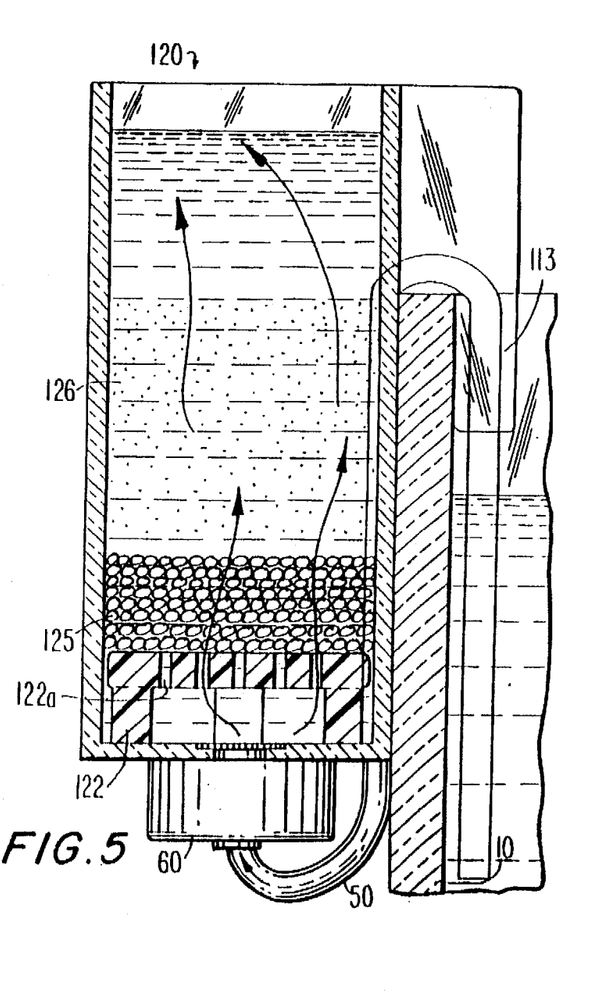
FIG. 5 is a side cross-sectional view of the filter of FIG. 1, taken along line 5—5.

The construction and operation of column 120 can be seen most clearly in reference to FIGS. 3 and 5. Column 120 is shown with a generally square cross-section. However, a round cross-sectional configuration or a cross-sectional shape of some other configuration can be used. Nevertheless, a square cross-sectional shape has been found to be the most aesthetical desirable and the most efficient in terms of cross-sectional area for a given overall width. Cross sectional areas from 1 to 16 square inches and larger have been found suitable. The size of the column depends on the bio load and tank size. Smaller filters and high flow rates can process a high quantity of organic material, but the currents created can be stressful to fish.

Column 120 includes an inlet 121 at the bottom center of column 120. Inlets positioned at other locations are less effective than those at the bottom, center of the column. Column 120 also includes a support plate (diffusion or flow distribution) 122, a bed of large diameter particles such as large grain sand or gravel 125 on flow distribution 122 and a layer of smaller particles such as small grain sand 126a on large particles 125.

In operation, water 40 is drawn from aquarium 20, through a tube 50 to inlet 121 by a pump 60. Pump 60 is shown mounted directly to the bottom of filter 100, over inlet 121. Alternate arrangements in which a pump is located within aquarium 20, intermediate aquarium 20 and filter 100 or in some other location for providing water from aquarium 20 to inlet 121 are also acceptable. However, it is aesthetical more desirable to locate pump 60 directly on filter 100 to provide a more compact, less scattered appearance.

When pump 60 is in operation, is forces water up through distribution plate 122, through large particles 125 and into a bed of small particles 126a. As shown in FIG. 5, as long as pump 60 provides water at a sufficiently high flow rate, it will cause relative movement (fluidization) in particles 126a, causing the particles to travel part of the way up column 120 and form a fluidized bed 126 of small particles 126a.

It is preferable to include diffusion plate 120 and large particles 125 in order to even out the flow profile of water 40 in column 120. Without distribution plate 122 and large particles 125, water 40 flowing through column 20 would have a non uniform velocity profile, in which the velocity at the center of column 120 is considerably higher than at the periphery thereof. The flow through column 120 is evened out by first forcing the water through a series of perforations 122a and then through large particles 125. This provides a more even flow of water 40 through fluidized bed 126 which leads to improved filtration properties. The flow can also be made more uniform through a specially designed diffusion plate alone, such as one having increased perforations at the periphery and specially configured channels. Alternatively, the perforation plate can be omitted and the flow can be evened through the use of large particles alone.

Figure 2:
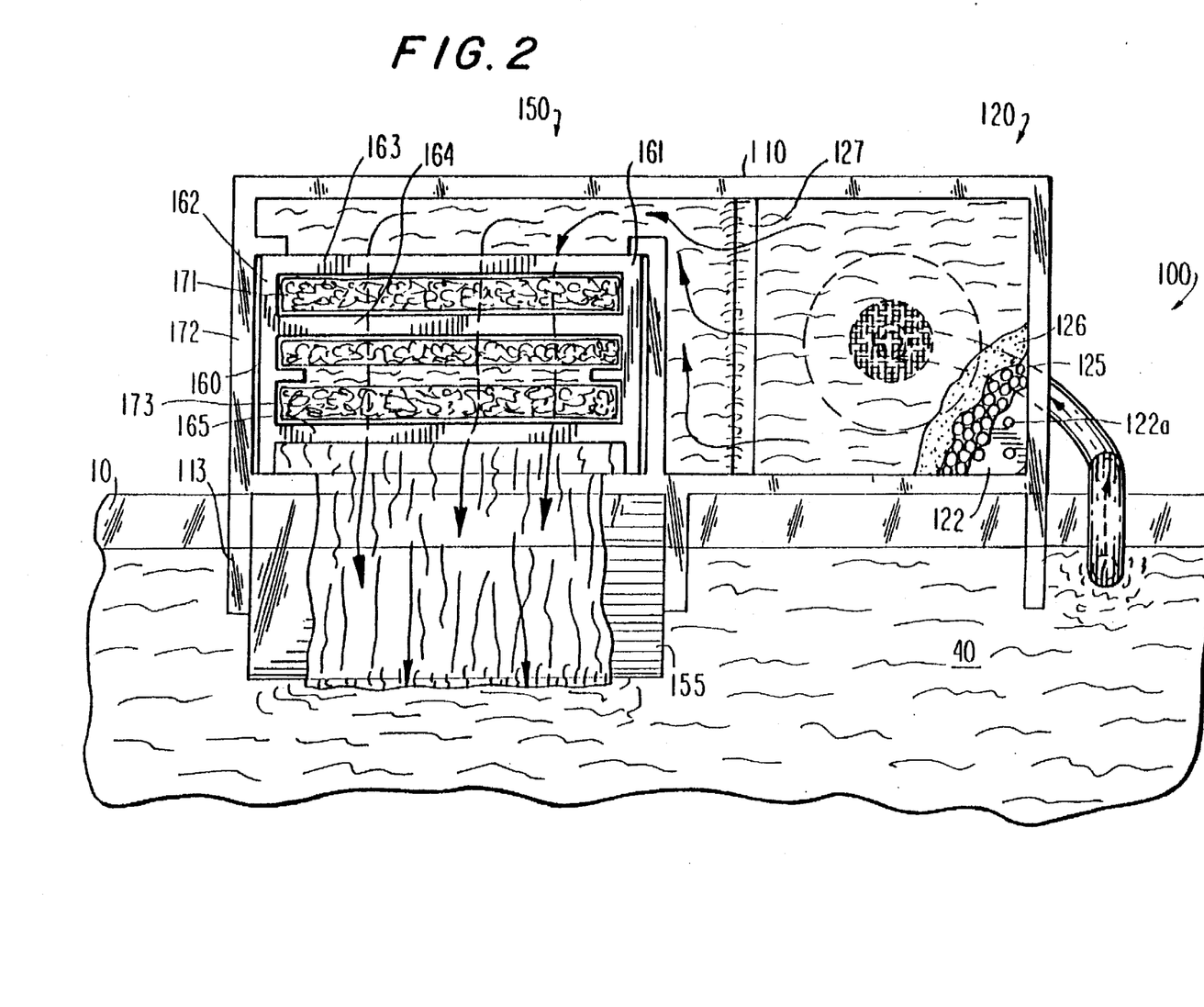
FIG. 2 is a top view of the filter of FIG. 1.
Figure 3:
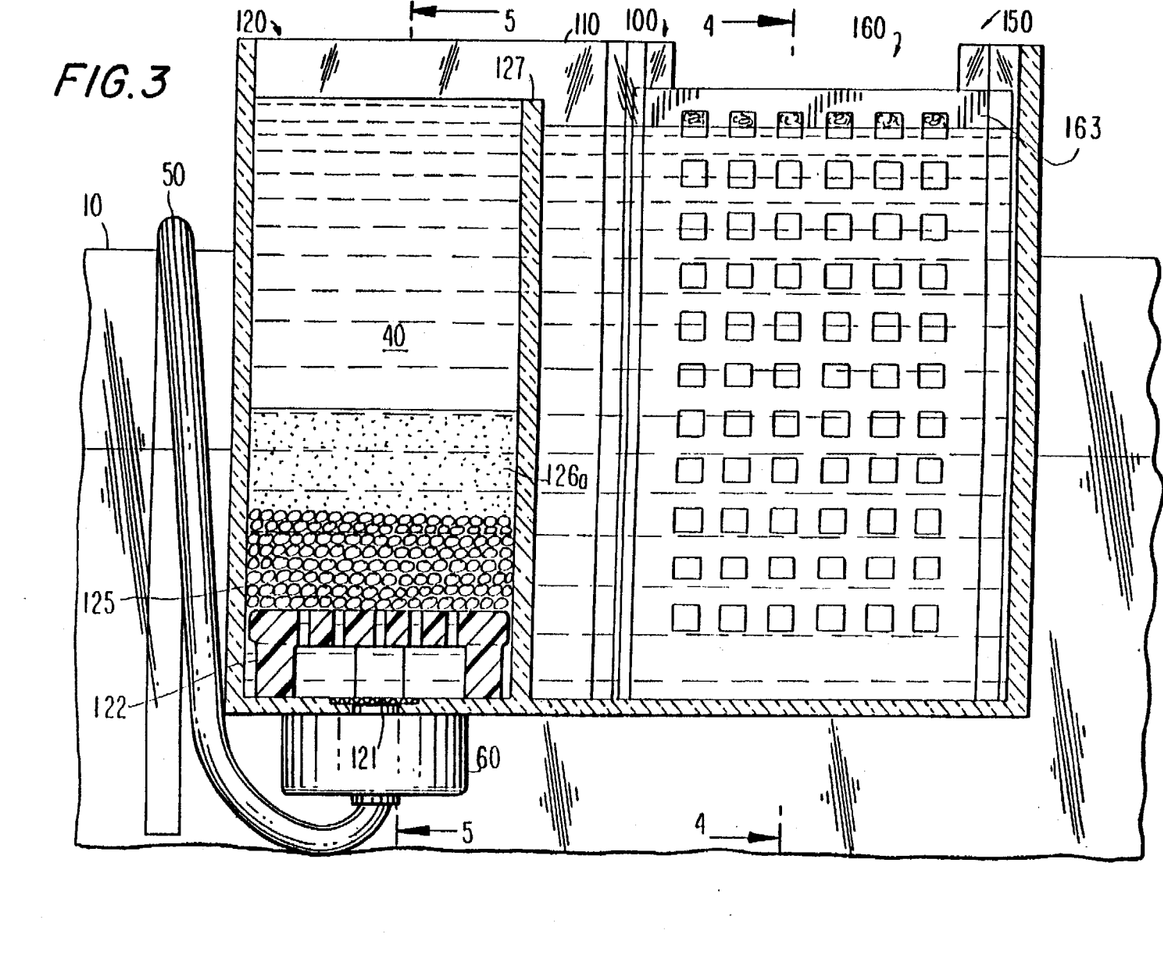
FIG. 3 is a front cross-sectional view of the aquarium filter of FIG. 1 taken along lines 3—3.
Figure 4:
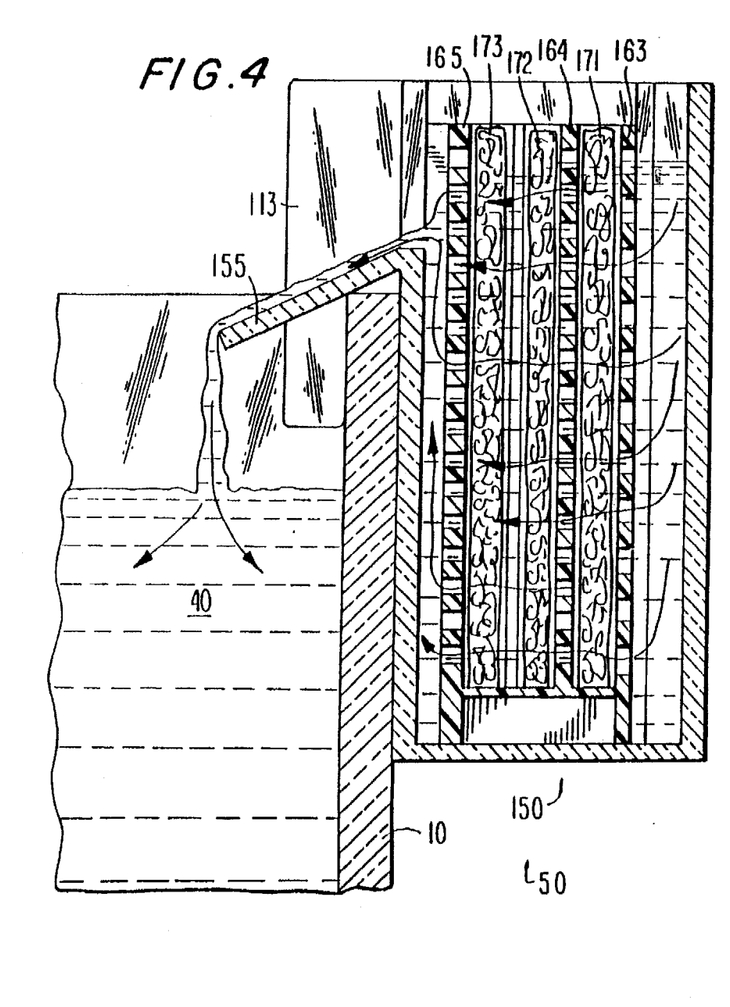
FIG. 4 is a side cross-sectional view of the filter of FIG. 1 taken along line 4—4.

As shown most clearly with reference to FIG. 2, after water 40 flows up through fluidized bed 126, it flows to the top of column 120 and over a lip 127 to filtration region 150. Filtration region 150 includes a removable filter cartridge 160. Filter cartridge 160 includes a first non perforated side 161 facing column 120 and a second non-perforated side 162 facing away from column 120. Filter cartridge 160 also includes a plurality of perforated panels 163, 164 and 165. By using the configuration shown having non-perforated sides and perforated front panels, water 40 flowing over lip 127 is forced around and behind cartridge 160 and then flows through cartridge 160, before spilling over ramp 155 and back to aquarium 20.

Cartridge 160 includes a fibrous pad 171 for trapping physical waste and sediment from water 40. Cartridge 160 also includes a pair of activated charcoal impregnated pads 172 and 173 for providing additional physical entrapment as well as the removal of organic material. Although other conventional arrangements for removing organic and physical waste from water 40 are acceptable, it has been found that the multiple pad arrangement shown is preferable. One drawback to a conventional configurations employing activated charcoal particles is that they are inconvenient to remove. When permitted to remain in a filter for an extended period of time, they begin to be colonized by autotrophic bacteria. This can diminish the ammonia removing effects of filter 100. However, by providing pads 171, 172 and 173 in a form that is easy to remove and replace, the chance for autotrophic bacteria to become established is diminished.

Figure 6:
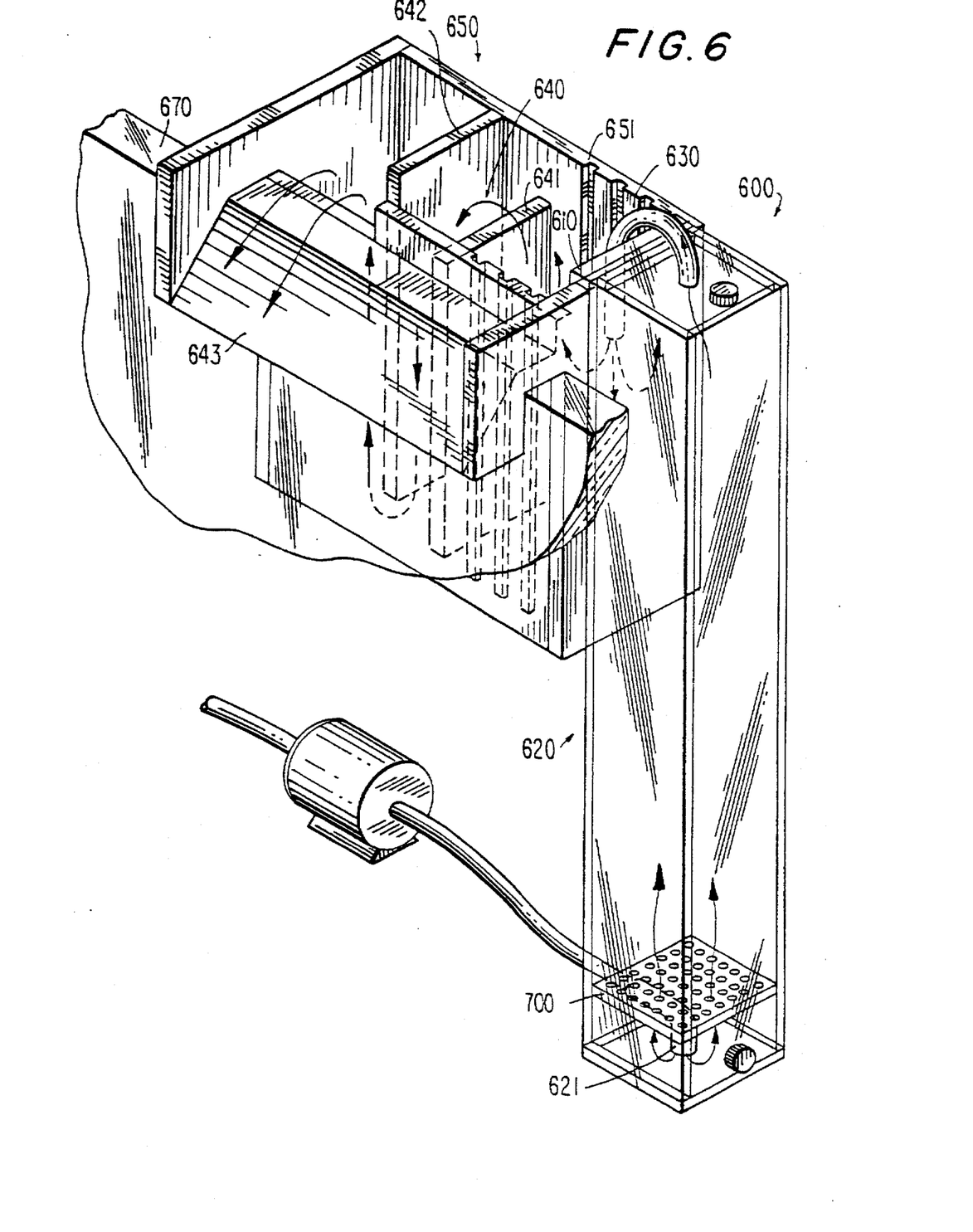
FIG. 6 is a perspective view of an aquarium filter constructed in accordance with another embodiment of the invention.

A filter 600 constructed in accordance with another embodiment of the invention includes a fluidization column 620 that is taller than an entrapment portion 650 of filter 600 and can hang from entrapment portion 600 by an integral hook 610. Water from an aquarium enters column 620 through a downwardly pointing inlet 621 below a flow distribution plate 700. By pointing inlet 621 downwards, a more uniform flow up through column 620 can be achieved. A bed of particles would be located in column 620, but are not shown, for clarity.

Water flows out of column 620 through a tube 630 into entrapment portion 650. Entrapment portion 650 includes a series of notches 651 for receiving fibrous pads. Entrapment portion 650 also includes a chamber 640 defined by a first wall 641 and a second wall 642. Resin or other entrapment or treatment materials can be located in chamber 640. Water through the pads (not shown), over first wall 641 flows under second wall 642 and over spillway 643 back to an aquarium 670.

Figure 7:
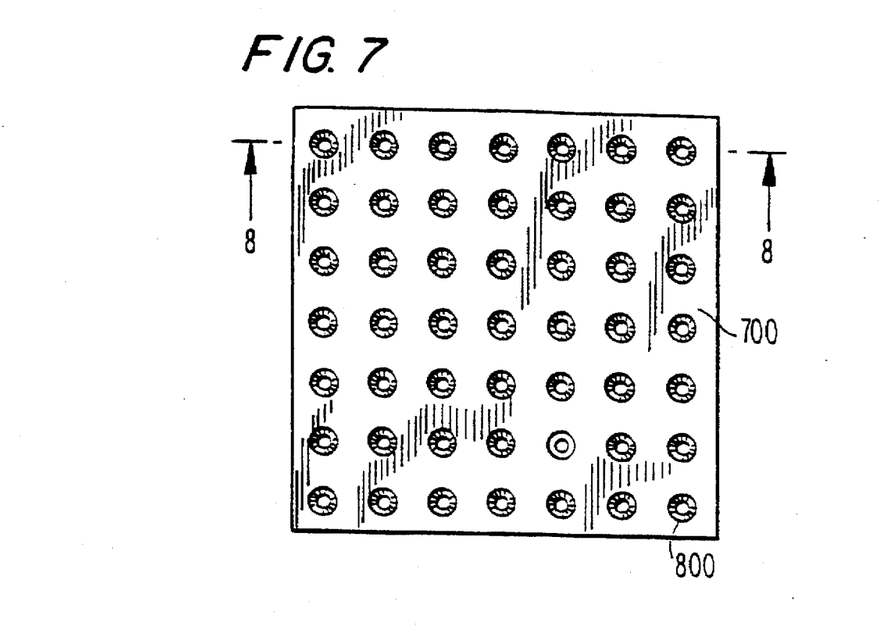
FIG. 7 is a top view of a flow distribution plate constructed in accordance with an embodiment of the invention.
Figure 8:
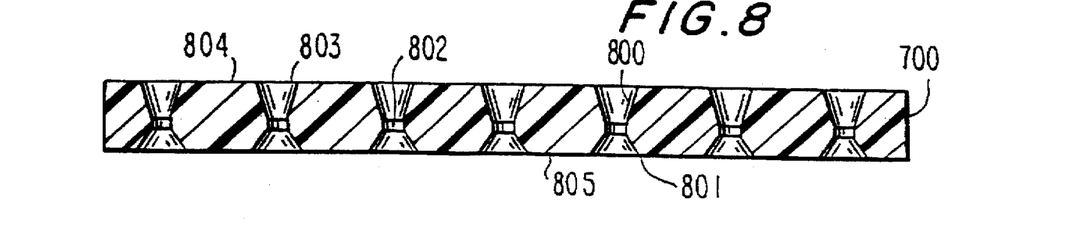
FIG. 8 is a cross sectional view of the plate of FIG. 7, taken along line 8—8.

A flow distribution plate 700, constructed in accordance with a preferred embodiment of the invention is shown in FIGS. 7 and 8. The function of plate 700 is to evenly distribute the velocity profile of the water flowing upwards from inlet 621 of relatively small diameter through column 620 of considerably larger diameter. Distribution plate 700 is also to support the bed of particles and to permit the use of particles with suitably small diameters.

Distribution plate 700 is constructed with overall dimensions equal to the inside cross-sectional dimensions of column 620. It is important that a tight seal exists between plate 700 and the inner walls defining column 620, to ensure that water does not bypass plate 700 and interfere with the flow pattern.

Distribution plate 700 includes a plurality of holes 800 formed therethrough to permit water from inlet 621 to flow through column 620. The walls of distribution plate 700 defining holes 800 are preferably formed with an "hourglass" shape. They include a large diameter bottom opening 801 of diameter $D_I$ at a bottom surface 805 of plate 700 and then taper inwardly to a small diameter section 802, having diameter $D_S$ and then taper outwardly to a large diameter top opening 803 having a diameter $D_T$ at the top surface 804 of plate 700, where water exits plate 700.

The "hourglass" shape provides several benefits. First, large bottom opening 801 enhances the turbulence caused by water swirling under plate 700 and therefore aids in keeping plate 700 clear of debris. The small diameter of small diameter section 802 regulates and evens the flow distribution profile of cross column 620. Large top opening 803 helps even the flow over a larger area and reduces "jets" of water shooting from the center of small section 802. The double taper construction also helps prevent particles from falling beneath plate 700. The larger particles will accumulate at the bottom of column 620 and will bridge across holes 800 if filter 600 is turned off. The double taper also enhances the ability of particles that do fall through to be blown back above plate 700 when water flows from outlet 621.

Plate 700 should be constructed with a thickness at least 3.5 times $D_S$, the diameter of small section 802. When a water pump 660 is relatively close to plate 700 and $D_I$ is approximately equal to the inside diameter of the water pump outlet port, then the number of holes 800 in plate 700 should be between about 1 to 3 times the value of: $(D_I/D_S)^2$. If the hole count is less than $(D_I/D_S)^2$, the flow rate will tend to be unduly restricted. If the hole count is greater than about 3 times that value, there will typically be too much open space in plate 700 and the resulting flow pattern is likely to be uneven. When the hole count is about 1 to 3 times $(D_I/D_S)^2$, the flow rate will not be unduly reduced, nor will the flow pattern out of plate 700 be undesirably irregular.

Holes 800 should be spaced evenly across the plate in a grid pattern. The grid spacing should be approximately equal to the length of a side of plate 700, divided by the square root of from 1 to 3 times $(D_I/D_S)^2$.

Various aspects and embodiments of the invention will be illustrated in connection with the following examples.

having an inside diameter of 0.375" entered halfway between the bottom of the column and the flow distribution plate and pointed downwards to the center bottom of the column. The bottom of the inlet port was 0.25" from the bottom of the column.

The flow distribution plate used with the small filter was a 2×2" having a 5×5 grid of holes. The overall plate thickness was 0.339". The holes were 0.422" apart and had an inner diameter between 0.093" and 0.083". The holes tapered upwards at an angle of 30° from a position 0.186" down from the top of the plate. The holes also tapered downwards at an angle of 70° from a position 0.100" up from the bottom of the plate.

Figure 9:
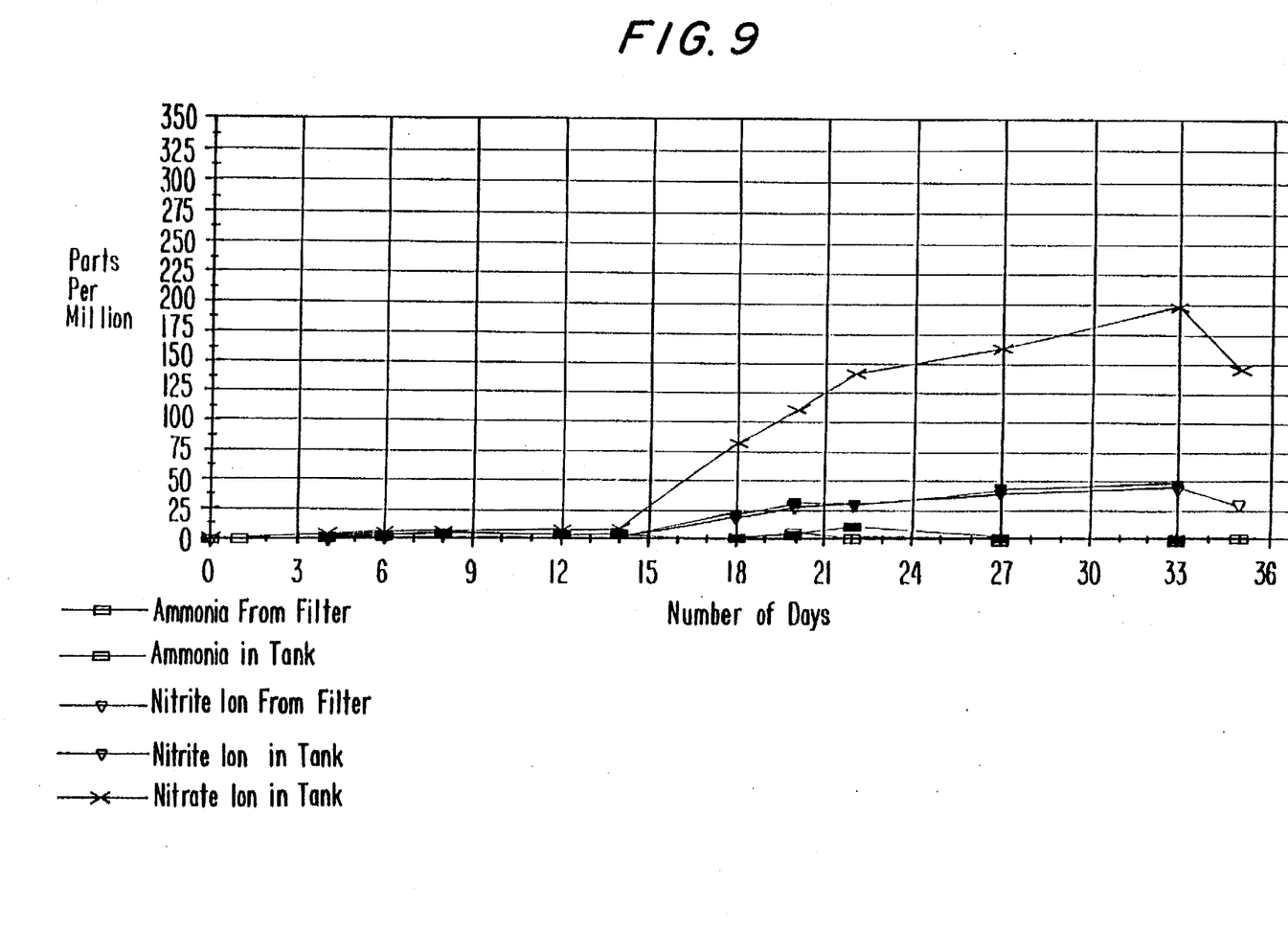
FIG. 9 is a graph showing the change of contaminant concentration with time when the aquarium is filtered in accordance with the invention.

To test the effectiveness of the small filter described above, the small filter was coupled to a 10 gallon aquarium having a dozen approximately 2" fish to provide a heavy bio load. Water flowing from the 10" column passed through two conventional carbon impregnated filter pads and a conventional floss pad in a filter media basket coupled to the column. Water flowed from the filter media basket back to the aquarium. The fish were fed twice daily in an amount equal to 3% of the total fish body weight. The pH, temperature, ammonia, nitrite and nitrate values both in the tank and coming out of the filter were measured periodically and the results are summarized below in Table 4 and are depicted graphically in FIG. 9.

TABLE 4

PERFORMANCE OF 2 INCH SQUARE FLUIDIZED BED FILTER

| Day | pH | Temp (°F.) | Ammonia Output From Filter | Ammonia Within Tank | Output From Filter Nitrite ion | Output From Filter Nitrate Nitrogen | Within Tank Nitrite ion | Within Tank Nitrate Nitrogen | Within Tank Nitrate Ion | Within Tank Nitrate Nitrogen |
|---|---|---|---|---|---|---|---|---|---|---|
| 0 | 8.37 | 68 |  | 1.0 |  |  | 0.07 | 0.02 | 2.7 | 0.6 |
| 1 | 8.15 | 74 |  | 0.8 |  |  |  |  |  | 0.0 |
| 4 | 7.93 | 72 | 1.7 | 1.9 |  |  | 0.40 | 0.12 | 5.3 | 1.2 |
| 5 | 7.76 | 72 | 2.1 | 2.8 | 0.86 | 0.26 | 1.19 | 0.36 | 6.6 | 1.5 |
| 8 | 7.74 | 70 | 5.2 | 5.4 | 0.56 | 0.17 | 0.50 | 0.15 | 7.0 | 1.6 |
| 12 | 7.87 | 70 | 4.1 | 3.1 | 1.45 | 0.44 | 1.19 | 0.36 | 7.9 | 1.8 |
| 14 | 7.78 | 72 | 5.2 | 4.1 | 1.03 | 0.31 | 1.03 | 0.31 | 10.0 | 2.3 |
| 18 | 7.53 | 70 | 0.7 | 1.3 | 19.80 | 6.00 | 16.87 | 5.11 | 82.4 | 18.7 |
| 20 | 7.58 | 74 | 3.4 | 4.8 | 28.12 | 8.52 | 25.28 | 7.66 | 110.0 | 25.0 |
| 22 | 7.59 | 72 | 10.5 | 2.0 | 28.38 | 8.60 | 28.38 | 8.60 | 140.8 | 32.0 |
| 27 | 7.47 | 72 | 1.1 | 0.2 | 40.59 | 12.30 | 37.29 | 11.30 | 162.8 | 37.0 |
| 33 | 7.00 | 72 | 1.3 | 0.7 | 45.38 | 13.75 | 42.90 | 13.00 | 198.0 | 45.0 |
| 35 | 7.00 | 73 |  | 0.0 |  |  | 29.21 | 8.85 | 145.2 | 33.0 |

However, these examples are presented for purposes of illustration and are not intended to be construed as limiting the scope of the invention.

EXAMPLE 1

A small fluidized bed filter for use with an aquarium of up to about 40–50 gallons in capacity was formed with the following dimensions. The column had a 2" by 2" square cross section and was 10" in height. 1.8 oz. of 20/30 silica, yielding a height of 0.5" and a surface area of about 2.0 square feet was combined with 7.1 oz. of F-35 silica, which had a height of 2" and a surface area of 22 square feet. Thus, the total surface area of the particle media in the 2-inch column was 24 ft². This column was operated with water flowing upwards at a rate of about 50–80 gallons per hour. This flow rate lead to a bed expansion of approximately 200%, from 2.5" to 5.0".

The flow distribution plate (diffusion plate) was positioned about 1.5" from the bottom of the column. An inlet As shown in the Table 4 and in FIG. 9, it took approximately 14 days for the nitrogen cycle within the aquarium to begin. At that point, there was a significant increase in nitrate value, as ammonia generated by the fish was converted by the fluidized bed filter into nitrate ions. The ammonia content both in the tank and coming out of the filter was maintained at an acceptably low value and at the end of 35 days, the amount of ammonia in the aquarium was virtually zero. It can also be seen that the expected "spikes" of ammonia values in the aquarium and coming out of the filter were relatively low and the nitrite ion concentration in the tank was also maintained at a suitably low level.

At approximately day 33, it became evident that anaerobic bacteria began to colonize oxygen depleted portions which are probably at the top of the fluidized bed and began converting nitrate ions into more simple constituents, such as nitrogen gas. Thus, the filter not only maintains low levels of ammonia and nitrites in the aquarium, it can control nitrate values as an added benefit.

EXAMPLE 2

Another fluidized bed filter was constructed with a column having a 3"×3" cross section and a height of 14". This column was filled with 4.1 oz. of 20/30 silica, which had a height of 0.5" and gave a surface area of 4.7 ft². The column also included 8.1 ozs. of F-35 silica which had a height of 1" and a surface area of 17.1 ft². The column also included 12.2 oz. of F-50 silica which had a height of 1.5" and a surface area of 38 ft², for a total of 59.8 ft² of surface area for the particulate media in the column. The column was run at over 100 gallons per hour flow rate and exhibited a bed expansion of 250%.

The flow distribution plate was positioned 1.5" from the bottom of the column and the inlet was centered and pointing downwards at the bottom of the column, below the distribution plate. The end of the inlet port was positioned 0.25" from the bottom of the column and had an inside diameter of 0.375".

The flow distribution plate was constructed with a 7 by 7 grid of holes having a maximum inner diameter of 0.093" and a minimum inside diameter of 0.83". The plate was 0.339", thick. The holes in the plate expanded downwards at an angle of 70° from a location 0.100" above the bottom of the plate and expanded outwardly at an angle of 30° from a position 0.186" below the top of the plate.

A plate having a suitable configuration, which can be used in a wide range of column cross sectional sizes can be constructed as follows. A square plate approximately 0.340" (plus or minus 0.03") having holes centered on a grid with approximate spacing of 0.422" by 0.422" (±0.005"). Holes have a bottom diameter $D_I$ at the bottom surface of the plate of approximately 0.25" and taper inwardly to a depth of approximately 0.10", at an angle of 70° (±5°). The hole then maintains a diameter $D_S$ of 0.093 to 0.082" for depth of approximately 0.050" (±0.005") and then taper outwardly to an approximately 0.18" diameter opening ($D_T$) at the top surface of the plate at an angle of 30° (±5°) with an approximate depth of 0.19". A 2" by 2" plate would contain 25 tapered holes with a 5×5 hole layout. A 3" by 3" plate would contain 49 tapered holes with a 7×7 layout. A 6" by 6" plate would include 196 holes arranged on a 14×14 layout.

It has been determined that for aquaculture applications, approximately 900 square feet of filtration media will handle the ammonia load produced by approximately 400 to 500 pounds of fish. For commercial units, 5 grades of sand are preferable to allow for horizontal channeling, thus reducing collisions between sand particles and allowing for high fluidization of up to 500% of the original height of the unfluidized bed of particles.

EXAMPLE 3

A large commercial unit was constructed with a square 6" by 61" cross section and an overall height of 6'. The water input had an inside diameter of 0.81" and was centered at the bottom of the column, pointing downwards, ¾ of an inch from the bottom. The center line of the input was located on the side of the column, 2¼" from the bottom. A flow distribution plate was located 4½" from the bottom of the column and had a 14×14" pattern of 196 hourglass shaped holes, having a constricted diameter ($D_S$) of 3/32, a top maximum diameter of 7/64" and a bottom diameter of 0.2". The holes tapered inwardly at an angle of 60° from the bottom surface ($D_I$=0.20") and tapered inwardly from $D_T$=7/64" at an angle of 25°–30°.

EXAMPLE 4

A second similarly constructed square plate also had a 6"×6" outside diameter and a thickness of 0.339". This plate also used a 14"×14" grid of holes and the holes were spaced 0.422" apart. From the bottom opening $D_I$, the holes tapered inwardly at an angle of 70° for 0.1", maintained a constricted diameter $D_S$ of 0.093" and then at a distance 0.186" from the top of the plate, tapered outwardly at an angle of 30°.

EXAMPLE 5

Figure 12:
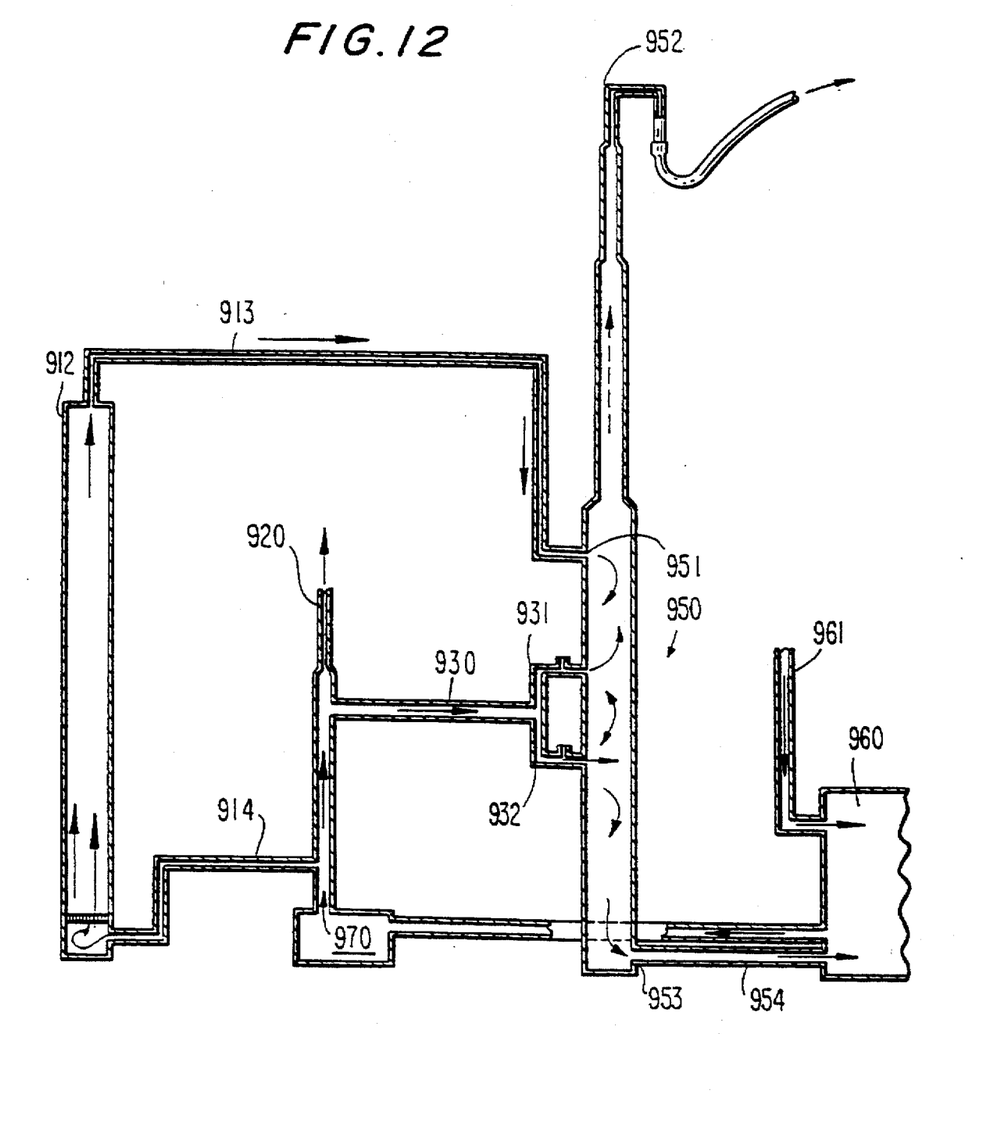
FIG. 12 is a schematic diagram of a fluidized bed coupled to a foam fractionation tower for use in large scale filtration applications.

The 6"×6"×6' column was connected to a foam fractionator for separating particulate matter from the aquarium water in a configuration shown generally in FIG. 12. Water from the top of a fluidized bed column 912 flows to the top portion of a foam fractionator 950 through a tube 913. The water enters the foam fractionator at an inlet 951 and then travels generally downwards. Water from a large fish tank, a plurality of aquariums or a fish pond is collected in a bottom sump 960 from a pipe 961 and a pump 970 pumps the water from bottom sump 960 to the bottom of column 912 through a tube 914, back to the aquariums through a tube 920 and to the bottom third of the foam fractionator through a tube 930.

Tube 930 splits into tubes 931 and 932. Tubes 931 and 932 have Venturi constrictions with openings to permit air to be sucked in. Due to the Venturi pressure drop and air being sucked in, the water tends to foam as it is sprayed into foam fractionator 950 from tubes 931 and 932. Bubbles will rise up to the top of foam fractionator 950 and water will flow downwards. Particles from the water will be carried to the top of foam fractionator 950, out an outlet 952 and are then discarded. Cleaned water flows out a bottom port 953 of foam fractionator 950 and back to bottom sump 960 through a filtered water return tube 954.

Using the filter assembly shown in FIG. 12, a large number of aquariums, large holding tanks or a fish pond with high bio-loads can be filtered in an efficient and cost effective manner.

EXAMPLE 6

Figure 11:
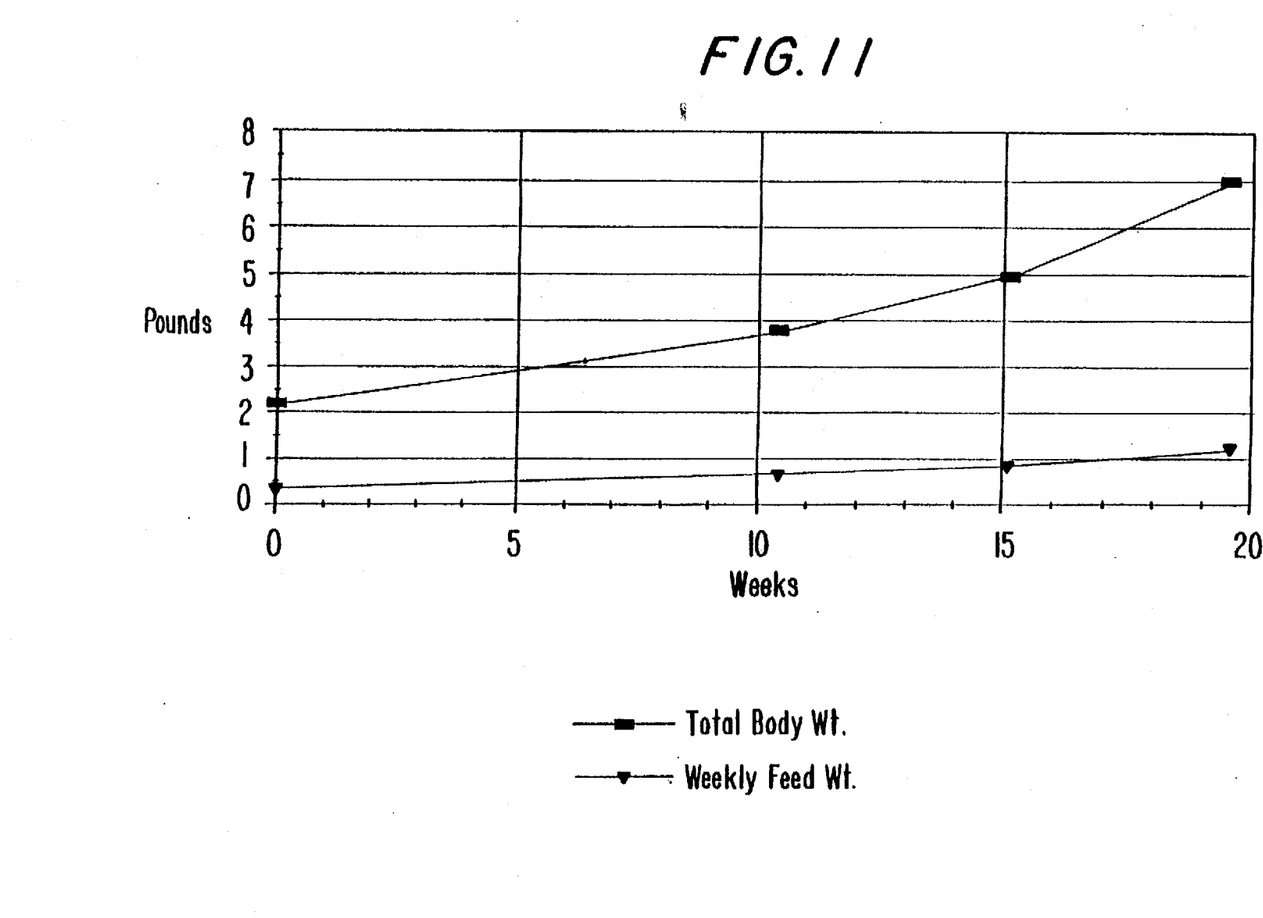
FIG. 11 is a graph showing the change in body weight with time for goldfish in the feeding study of FIG. 10.

To demonstrate the effectiveness of the large 6' tall 6" square shaped fluidized bed column, 12 ten gallon tanks, each having 11 approximately 2" fish were connected. Water changes were not performed and any water loss due to evaporation was automatically replaced with a reverse osmosis water supply system. At the start of the study, the 132 goldfish had a combined body weight of 2.19 lbs. in the 120 gallon system, which had been running with an alternate filtration system for 13 days. As shown in Table 5, the fish were initially fed 0.05 lbs. of food per day and the amount of food increased as the body weight of the fish increased during the period of the study as is also shown in FIG. 11.

TABLE 5

Weights of Goldfish in Feeding Study

| Days | Total Body Weight (lb.) | Increase (lb.) | Total Daily Feed (lb.) | Increase (lb.) | Total Weekly Feed (lb.) | Increase (lb.) |
|---|---|---|---|---|---|---|
| 0 | 2.19 | 0.00 | 0.05 | 0.00 | 0.38 | 0.00 |
| 73 | 3.76 | 1.57 | 0.09 | 0.04 | 0.66 | 0.28 |
| 106 | 4.97 | 2.79 | 0.12 | 0.07 | 0.87 | 0.49 |
| 137 | 7.01 | 4.83 | 0.16 | 0.12 | 1.23 | 0.84 |

Figure 10:
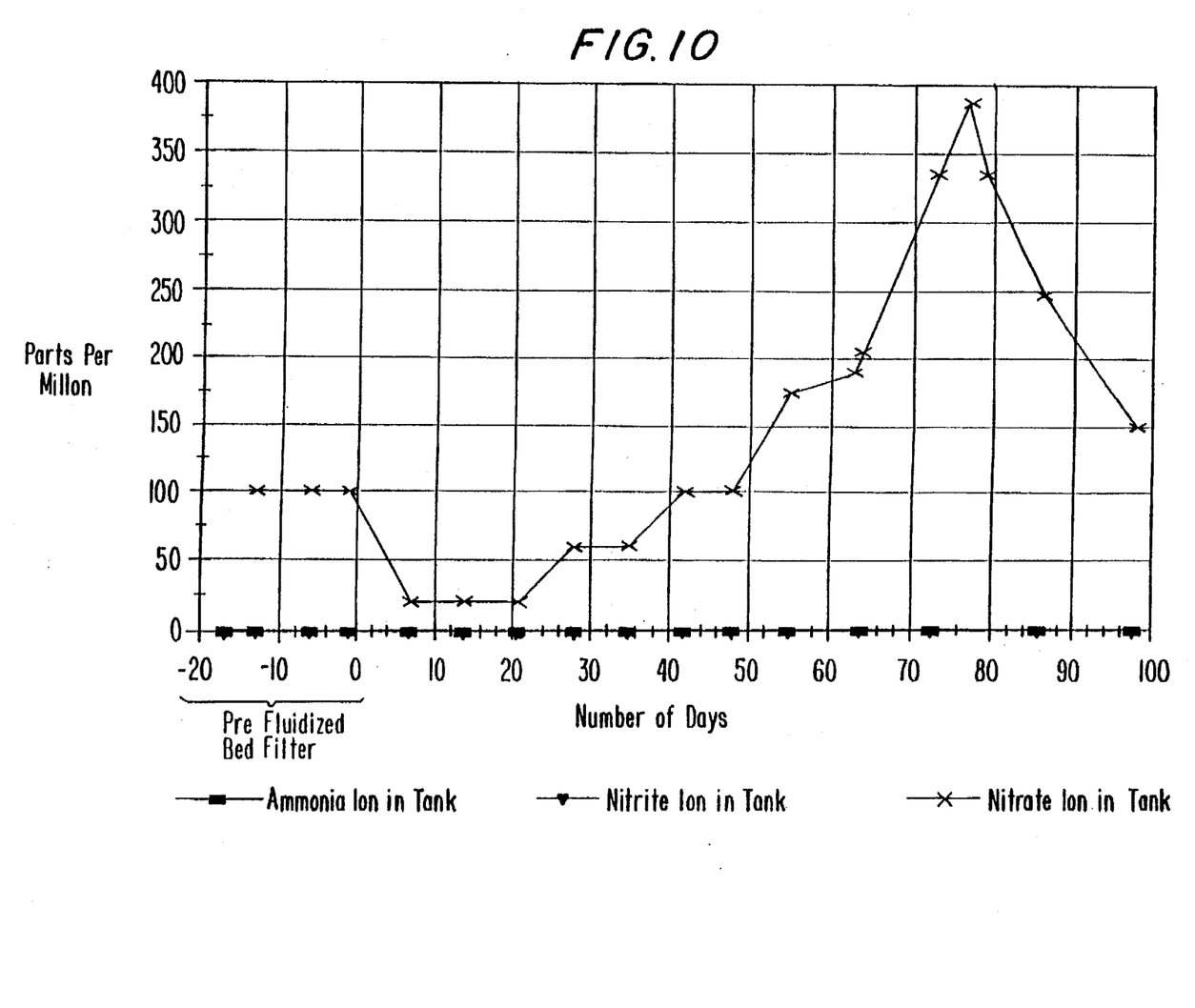
FIG. 10 is a graph showing the change (or lack of change) in ammonia ion, nitrite ion and nitrate ion values for water of the tanks in a goldfish feeding study.

As shown in Table 6 and in FIG. 10, the 6"×6"×6' column was capable of maintaining ammonia levels at acceptably low values. It is expected that the filter in accordance with the invention can handle 5 times the bio-loads of conventional filters.

The nitrogen cycle kicked in at about day 20 and thereafter, the expected spikes in the ammonia and nitrite ion values were much lower than would be expected. Furthermore, at approximately day 75, anaerobic regions in the filter began reducing the nitrate ion values and it can be seen that with continued operation, there would be continued reduction in nitrate ion numbers.

TABLE 6

Water Quality For Goldfish System w/Fluidized Bed System

| Day | pH | Temp. (°F.) | Ammonia Ion | Nitrite Ion | Nitrite Ion |
|---|---|---|---|---|---|
| Conventional Fitler | | | | | |
| −13 | 6.88 | 70.7 | 0.24 | 1.00 | +100.00 |
| −6 | 6.99 | 72.5 | 0.50 | 1.00 | +100.00 |
| −1 | 6.73 | 74.0 | 0.50 | 0.50 | +100.00 |
| Filter in Accordance with the invention | | | | | |
| 7 | 6.93 | 77.6 | 1.00 | 1.00 | 20.00 |
| 14 | 7.40 | 79.5 | 0.25 | 0.50 | 20.00 |
| 21 | 7.04 | 70.9 | 0.25 | 0.25 | 20.00 |
| 28 | 7.09 | 77.0 | 0.00 | 0.25 | 60.00 |
| 35 | 7.03 | 78.5 | 0.00 | 0.00 | 60.00 |
| 42 | 6.98 | 77.1 | 0.00 | 0.25 | 100.00 |
| 48 | 6.83 | 76.2 | 0.00 | 0.25 | +100.00 |
| 55 | 6.67 | 78.9 | 0.25 | 0.25 | 175.00 |
| 63 | 6.95 | 77.8 | 0.34 | 0.29 | 189.00 |
| 64 | 7.05 | 80.0 | 0.40 | 0.17 | 205.00 |
| 73 | 6.76 | 76.0 | 0.24 | 0.38 | 334.40 |
| 77 | 6.47 | 80.0 | 0.23 | 0.21 | 385.00 |
| 79 | 6.47 | 78.0 | 0.20 | 0.18 | 334.40 |
| 86 | 6.13 | 80.0 | 0.20 | 0.11 | 246.60 |
| 98 | 6.48 | 83.0 | 0.14 | 0.04 | 149.60 |

It will thus be seen that the objects set forth above, among made apparent from the preceding description, are efficiently attained and, since certain changes may be made in carrying out the above method and in the constructions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention described and all statements of the scope of the invention which, as a matter of language, might be said to fall therebetween.

Particularly it is to be understood that in said claims, ingredients or compounds recited in the singular are intended to include compatible mixtures of such ingredients wherever the sense permits.

What is claimed is:

1. A method of treating water in an aquarium, comprising the steps of:
    removing water from an aquarium and delivering the water to the bottom of a column both relatively light and relatively heavy particles therein, the column having a tops a bottom, and a support plate positioned across the interior of the column and spaced above the bottom of the column, the plate formed with a plurality of openings arranged in a pattern for permitting substantially uniform flow of water therethrough for fluidizing the bed of particles, each opening defined by a continuous wall extending from a top surface of the plate to a bottom surface of the plate and a bed of particles with bacteria growing thereon over the plate, flowing water from the aquarium up through the openings in the plate and then up through the bed of particles in the column with a substantially uniform velocity profile, using the flowing water to expand the bed of particles to a volume greater than the bed of particles has at rest and creating a stratification of particles, with the lightest particles at a top portion of the expanded bed, the heaviest particles at a bottom portion of the expanded bed and substantially no mixing of particles from the top of the expanded bed to the bottom of the expanded bed.

2. The method of claim 1, wherein the bed of particles includes sand having multiple sieve number sizes.

3. The method of claim 1, wherein the plate has straight sides and the openings in the plate are distributed evenly across the plate.

4. The method of claim 1, wherein the openings in the plate taper from a first diameter at the top surface of the plate to a more narrow diameter below the top surface of the plate.

5. The method of claim 1, wherein the openings in the plate taper from a first diameter at the bottom surface of the plate to a more narrow diameter above the bottom surface of the plate.

6. The method of claim 1, wherein the openings in the plate have a double taper hour glass type shape.

7. The method of claim 1, wherein the plate has an area of from about 4 to 16 square inches.

8. The method of claim 1, wherein the openings have a non-uniform diameter, including a diameter $D_I$ at the in-flow bottom surface of the plate and taper inwardly from the bottom surface to a smaller minimum diameter $D_S$ and the number of openings in the plate is about 1 to 3 times $(D_I/D_S)^2$.

9. The method of claim 1, wherein the openings have a diameter $D_T$ at the top surface of the plate and taper inwardly from the top surface to a smaller minimum diameter $D_S$ and $D_T$ is about 2 to 3 times larger than $D_S$.

10. The method of claim 1, wherein the bed of particles includes at least 3 sieve numbers of sand.

11. The method of claim 1, wherein the particles comprise at least 3 sieve number sizes of sand and each size is present as at least 5 percent of the total amount of sand.

12. The method of claim 1, wherein the water is directed downwards in the column before it travels upwards through the plate.

13. The method of claim 1, including the step of using the bacteria to convert waste in the water from the aquarium into ammonia, as the water travels upwards through the bed of particles.

14. The method of claim 1, including the step of using the bacteria to convert ammonia in the water from the aquarium into nitrates, as the water travels upwards through the bed of particles.

15. The method of claim 1, including the step of using bacteria to convert nitrates in the water from the aquarium into nitrogen gas as the water travels upwards through the bed of particles.

16. The method of claim 1, wherein the rate of the flow of water up through each opening is substantially the same.

17. A method of treating water in an aquarium, comprising the steps of:
    removing water from an aquarium and delivering the water to the bottom of a column, the column having a top, a bottom, and a support plate positioned across the interior of the column and spaced above the bottom of the column, the plate formed with a plurality of openings spaced across the plate, each defined by a continuous wall extending from a top surface of the plate to a bottom surface of the plate, the openings tapering from an outer surface of the plate to a more narrow interior portion, and a bed of particles with bacteria growing thereon over the plate, flowing water from the aquarium up through the tapered openings in the plate and then up through the bed of particles in the column and using the flowing water to expand the bed of particles to a volume greater than the volume the bed of particles has at rest.

18. The method of claim 17, wherein the openings in the plate taper from a first diameter at the top surface of the plate to a more narrow diameter below the top surface of the plate.

19. The method of claim 17, wherein the openings in the plate taper from a first diameter at the bottom surface of the plate to a more narrow diameter above the bottom surface of the plate.

20. The method of claim 17, wherein the openings in the plate have a double taper hour glass type shape.

\* \* \* \* \*